United States Patent
Zhou et al.

(10) Patent No.: US 9,879,136 B2
(45) Date of Patent: *Jan. 30, 2018

(54) FLAME RETARDANT POLY(HEXANO-6-LACTAM)

(71) Applicant: PolyOne Corporation, Avon Lake, OH (US)

(72) Inventors: Chongfu Zhou, Avon, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/910,822

(22) PCT Filed: Aug. 7, 2014

(86) PCT No.: PCT/US2014/050179
§ 371 (c)(1),
(2) Date: Feb. 8, 2016

(87) PCT Pub. No.: WO2015/021299
PCT Pub. Date: Feb. 12, 2015

(65) Prior Publication Data
US 2016/0185961 A1 Jun. 30, 2016

Related U.S. Application Data

(60) Provisional application No. 61/863,619, filed on Aug. 8, 2013.

(51) Int. Cl.

| | | |
|---|---|---|
| *C08L 77/02* | (2006.01) | |
| *C08L 85/02* | (2006.01) | |
| *C08L 71/12* | (2006.01) | |
| *C09K 21/14* | (2006.01) | |
| *B33Y 10/00* | (2015.01) | |
| *B33Y 80/00* | (2015.01) | |

(52) U.S. Cl.
CPC ............... *C08L 77/02* (2013.01); *C08L 71/12* (2013.01); *C08L 85/02* (2013.01); *C09K 21/14* (2013.01); *B33Y 10/00* (2014.12); *B33Y 80/00* (2014.12); *C08L 2201/02* (2013.01); *C08L 2205/035* (2013.01)

(58) Field of Classification Search
CPC ........... C08L 77/02; C08L 85/02; C08L 71/12
See application file for complete search history.

(56) References Cited

U.S. PATENT DOCUMENTS

| | | | | |
|---|---|---|---|---|
| 4,322,714 A | * | 3/1982 | Morgan | B60R 25/1006 340/427 |
| 4,331,614 A | * | 5/1982 | Schmidt | C08G 79/04 528/167 |
| 4,788,259 A | | 11/1988 | Nielinger et al. | |
| 4,822,836 A | * | 4/1989 | Wroczynski | C08K 5/09 524/139 |
| 4,866,114 A | * | 9/1989 | Taubitz | C08L 77/00 524/100 |
| 4,888,370 A | | 12/1989 | Freitag et al. | |
| 5,071,894 A | | 12/1991 | Weil et al. | |
| 5,258,439 A | | 11/1993 | Togashi et al. | |
| 6,410,621 B1 | | 6/2002 | Martin | |
| 8,975,367 B2 | | 3/2015 | Freitag et al. | |
| 2001/0007888 A1 | * | 7/2001 | Asano | C08K 5/34928 524/115 |
| 2006/0014866 A1 | | 1/2006 | Ottenheijm | |
| 2009/0043013 A1 | * | 2/2009 | Stahl | C08L 67/02 523/351 |
| 2012/0034478 A1 | * | 2/2012 | Pepers | C08F 279/02 428/463 |
| 2014/0224529 A1 | * | 8/2014 | Dobashi | H05K 3/285 174/254 |
| 2014/0308505 A1 | | 10/2014 | Schmitt | |
| 2016/0122534 A1 | * | 5/2016 | Zhou | C08L 69/00 524/151 |

FOREIGN PATENT DOCUMENTS

| | | | | |
|---|---|---|---|---|
| DE | 4007730 A1 | * | 9/1991 | ........... C08K 5/5333 |
| EP | 0436136 A1 | * | 7/1991 | ........... C08G 65/485 |

OTHER PUBLICATIONS

Machine translated English language equivalent of DE 4007730 (Sep. 1991, 11 pages).*
Leong (Evaluation of polyphosphates and polyphosphonates as degradable biomaterials. Journal of Biomedical Materials Research. 25, 1991. pp. 1151-1167).*

* cited by examiner

*Primary Examiner* — Brieann R Johnston
(74) *Attorney, Agent, or Firm* — Michael J. Sambrook; Maria M. Hoke

(57) ABSTRACT

Poly(hexano-6-lactam) (also known as Nylon 6) compounds that are flame retardant using non-halogenated ingredients are disclosed. Polyphenylene ether acts as a synergist when used in specific amounts in combination with polyphosphonate to achieve a V-0 rating in a UL 94 test at thicknesses of about 3.18 mm.

9 Claims, No Drawings

FLAME RETARDANT POLY(HEXANO-6-LACTAM)

CLAIM OF PRIORITY

This application claims priority from U.S. Provisional Patent Application Ser. No. 61/863,619 filed on Aug. 8, 2013, which is incorporated by reference.

FIELD OF THE INVENTION

The present invention concerns poly(hexano-6-lactam) (also known as Nylon 6) compounds that are flame retardant using non-halogenated ingredients.

BACKGROUND OF THE INVENTION

Thermoplastic compounds, unlike wood, metal, or glass, do not rot, rust, or shatter. For that reason, the world in the past seventy years has seen a revolution in material science arising from the combination of a thermoplastic resin and one or more functional additives to provide specific properties to the resin.

Unlike wood but like metal and glass, at a given temperature, a thermoplastic resin can melt. Its processing versatility benefits from its capacity to mix with the functional additives while in a molten state.

But in use, the exposure of a fully formed thermoplastic article to excessive heat or flame can be quite detrimental to property and person. Flame retardancy is a key attribute for many household items, for example hair dryers, curtains and drapes, water heaters and kitchen appliances. In addition, materials that are non-flammable and non-combustible are critical for many applications in industries, such as electronics, telecommunications, and transportation. Therefore, flame retardants, drip suppressants, mineral fillers, and char formers are frequently added as functional additives to help thermoplastic compounds retard the effects of heat or flame from melting or even burning.

Recently non-halogenated flame retardants have become popular because they minimize the release of halogenated chemicals if the plastic article would begin to degrade, melt, or burn. However, polymer blends using non-halogenated flame retardants are often more difficult to process and have reduced physical and mechanical properties when compared to the original thermoplastic resin.

SUMMARY OF THE INVENTION

What the art needs is a non-halogenated nylon 6 capable of passing the Underwriters' Laboratories Test No. 94 (UL 94 test) by achieving a V-0 rating at a thickness of at least 3.18 mm.

Even with the variety of functional additives commercially available, it is not a predictable pathway for a person having ordinary skill in the art to find a particular combination of ingredients which, together, can achieve a V-0 rating in a UL 94 test.

The present invention has found that polyphenylene ether acts as synergist when used in specific amounts in combination with polyphosphonate to achieve a UL 94 test V-0 rating at thicknesses of at least about 3.18 mm, a task very difficult and unpredictable to achieve.

Starting with a nylon 6 resin, a non-halogenated flame retardant is combined, by mixing or otherwise, with other functional ingredients to achieve that coveted V-0 rating for the injection molded compound at a thickness about 3.18 mm and greater.

One aspect of the present invention is a flame retardant nylon compound, comprising poly(hexano-6-lactam), polyphosphonate, polyphenylene ether, optionally compatabilizer, and optionally polytetrafluoroethylene; wherein the weight percent of polyphosphonate and polyphenylene ether combined in the compound is at least about 55%. In addition to take advantage of the synergist relationship between the polyphosphonate and polyphenylene ether, the weight percent of each individually is greater than zero.

Features of the invention will be explored below.

EMBODIMENTS OF THE INVENTION

Poly(hexano-6-lactam)

Poly(hexano-6-lactam), also known as polyamide 6 or nylon 6, is a type of polyamide having the molecular formula $(C_6H_{11}NO)_n$. Nylon 6 is made through ring-opening polymerization of caprolactam. The result of this reaction is a polymer having a backbone that contains amide (—CONH—) linkages. Nylon 6 is commercial widely available from several manufacturers, including BASF, DSM, DuPont, Honeywell, Dow, and Bayer MaterialScience LLC.

Polyphosphonate

Polyphosphonates used in this invention are polymer compounds containing repeating monomer units of $CH_3$—$PO(OH)_2$ or $CH_3$—$PO(OH)$—$OR$, where R represents alkyl or aryl groups; or $R^1O$—$PO(R^3)$—$OR^2$, where $R^1$ and $R^2$ are aromatic or aliphatic and $R^3$ represents alkyl $C_1$-$C_6$ or aromatic hydrocarbon group. Polyphosphonates are useful as flame retardants for polymer compounds. Polyphosphonates can be linear or branched. Preferred are polyphosphonate homopolymers having a polyphosphorus content of greater than about 8 weight percent, a glass transition temperature of at least about 100° C., and a limiting oxygen index of about 50% or higher. Preferred are polyphosphonate homopolymers having a high molecular weight represented by about 10,000 g/mol or higher; and more preferably about 20,000 g/mol or higher.

FRX Polymers, Inc. of Chelmsford, Mass., USA manufactures flame retardant polyphosphonates, including polyphosphonate homopolymers, such as Nofia™ HM1100.

Polyphenylene Ether

Polyphenylene ether (PPE), also called polyphenylene oxide, is a thermoplastic, linear, non-crystalline polymer. PPE is characterized by a unique combination of chemical, physical and electrical properties over a temperature range of more than 600° F., extending from a brittle point of about −275° F. to a heat distortion temperature of about 375° F. As a result of this combination of properties, PPE is suitable for a broad range of applications. In particular PPE is known for its flame retardance as a char former. The polyphenylene ethers suitable for use in the present invention are well known in the art and may be prepared by any of a number of catalytic and non-catalytic processes from corresponding phenols or reactive derivatives thereof. Commercial manufacturers of PPE include SABIC Innovative Plastics, China National Blue Star, and Evonik Degussa GmbH.

Polytetrafluoroethylene

Polytetrafluoroethylene (PTFE) is known to be useful as a drip suppressant because it tends fibrillate and elongate during injection molding. Fibrils shrink upon exposure to heat from a flame and hence retard dripping of the matrix in which the fibrils reside.

PTFE can have a particle size ranging from about 5 μm to about 25 μm with the possibility of aggregation and agglomeration.

PTFE is commercially available from a number of manufacturers, but the best known is the Teflon™ brand from DuPont which invented the polymer.

Though PTFE is fluorinated, its presence in the compound is not regarded by those having skill in the art of flame retardant compounds as compromising the non-halogenated characteristics of the flame retardant itself because the amount of PTFE present is very minor. Therefore, the use of a fluorinated drip suppressant in the amounts identified in this invention does not disqualify the compound from being considered a non-halogenated flame retarded thermoplastic compound according to the course of conduct in the thermoplastic compound industry.

Additional Additives

A variety of additives known to those skilled in the art can be included in nylon 6 compounds of the present invention to improve processing or performance properties. In particular, a compatabilizer can be useful in the present invention to prevent a film of the nylon 6 compound from delaminating. Ingredients known as compatibilizers for compositions of nylon and polyethylene ether include: maleic anhydride, fumaric acid, citric acid, malic acid, reaction products of a polyphenylene ether and trimellitic anhydride acid chloride and reaction products of a polyphenylene ether and maleic anhydride or fumaric acid.

In addition, the compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com website), can select from many different types of additives for inclusion into the compounds of the present invention.

Non-limiting examples of optional additives include heat stabilizers, char formers, adhesion promoters; biocides; anti-fogging agents; anti-static agents; anti-oxidants; bonding, blowing and foaming agents; dispersants; fillers and extenders; smoke suppressants; impact modifiers; initiators; lubricants; micas; pigments, colorants and dyes; plasticizers; processing aids; release agents; silanes, titanates and zirconates; slip agents, anti-blocking agents; stearates; ultraviolet light absorbers; viscosity regulators; waxes; catalyst deactivators, and combinations of them.

Range of Ingredients

Table 1 shows acceptable, desirable, and preferable ranges of ingredients useful in the present invention, all expressed in weight percent (wt. %) of the entire compound. The compound can comprise, consist essentially of, or consist of these ingredients.

TABLE 1

| Ingredient (Wt. %) | Acceptable | Desirable | Preferable |
| --- | --- | --- | --- |
| Poly(hexano-6-lactam) (Nylon 6) | 20-80 | 35-75 | 45-65 |
| Polyphosphonate | 10-45 | 30-40 | 35-40 |
| Polyphenylene ether | 10-45 | 20-30 | 20-25 |
| Compatibilizer | 0-2.0 | 0.5-1.0 | 0.3-0.5 |
| Stabilizer | 0-1 | 0-1 | 0-1 |

TABLE 1-continued

| Ingredient (Wt. %) | Acceptable | Desirable | Preferable |
| --- | --- | --- | --- |
| Polytetrafluoroethylene | 0-3 | 0-3 | 0-3 |
| Optional Additives | 0-3 | 0-3 | 0-3 |

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 350 to about 450 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com website), one can make articles of any conceivable shape and appearance using compounds of the present invention.

Usefulness of the Invention

Nylon 6 has an excellent set of properties for many consumer and industrial applications and is generally competitively priced in comparison to other types of nylon. Some of the uses for nylon 6 include: carpets, rugs and home textiles; engineering plastics (automotive, E&E, equipment housings etc.); tire cord (heavy-duty bias ply truck & bus, industrial, off-the-road and agricultural tires); textiles (apparel, hosiery, lingerie, sportswear, swimwear, casual wear, fashion wear, socks, umbrella, luggage, tents, parachutes, sleeping bags, etc.); and film (food packaging, industrial packaging, medical applications).

Applications of nylon 6 are recyclable back to the virgin monomer caprolactam. Any plastic article which is currently made from a nylon 6 compound can now be made from the non-halogenated flame retardant compound of this invention.

Nylon 6 compounds can be shaped by extrusion, molding, calendering, additive manufacturing, 3D printing, thermoforming, or other means of shaping into any plastic article usable in an interior or confined space where fire can cause personal injury or property damage. Therefore, nylon 6 compounds that resist burning and dripping are desirable. Literally any plastic article useful in a human-occupied space such as a building, a vehicle, or a tunnel can benefit from the flame retardancy of this nylon 6 compound.

A person having ordinary skill in the art may decrease the amount of polyphosphonate, to reduce cost or to minimize the impact of the phosphonate on key physical properties, by leveraging the combined amount of polyphenylene ether and polyphosphonate. In addition, it may be desirable to increase the amount of polyphenylene ether, because it is more hydrolytically stable than polyphosphonates.

By achieving a UL 94 V-0 rating at a thickness as thin as 3.18 mm, it is known that a plastic article having any larger thickness will also achieve a UL 94 V-0 rating.

Underwriters' Laboratories Test No. UL 94 serves as the litmus test for flame retardant thermoplastic compounds. As seen in Table 2, the V-0 rating is distinguished from V-1 and V-2 ratings, which are less acceptable if one is seeking the best flame retardance rating. For certain uses, V-1 is acceptable.

TABLE 2

| Criteria Conditions | V-0 | V-1 | V-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |
| Afterflame or afterglow of any specimen up to the holding clamp | No | No | No |
| Cotton indicator ignited by flaming particles or drops | No | No | Yes |

Examples provide data for evaluation of the unpredictability of this invention.

EXAMPLES

Table 3 shows the list of ingredients for Comparative Examples A-O and Examples 1-3.

TABLE 3

| Brand | Chemical | Purpose | Maker |
|---|---|---|---|
| Ultramid ® B27 E 01 | Poly(hexano-6-lactam) (Nylon 6) (CAS #25038-54-4) | Matrix | BASF |
| Nofia ™ HM1100 (FRX-100) | Polyphosphonate homopolymer CAS #68664-06-2 | Non-halogen flame retardant additive | FRX Polymers Inc. |
| Blue Star LXR40 PPE | Polyphenylene ether CAS #25134-01-4 Mn = 30,000 g/mol ~37,000 g/mol | Char former | China National Blue Star |
| Low MW PPE | Polyphenylene ether CAS #25134-01-4 Mn = 10,505 g/mol | Char former | Preparation is described below |
| Noryl ® PPO ™ 630-111 | Polyphenylene ether CAS #25134-01-4 Mn = 17,300 g/mol | Char former | Sabic |
| Irganox ® B225 | 50/50 blend of trisarylphosphite and sterically hindered phenolic antioxidant | Heat/processing stabilizers | Ciba |
| TEFLON ® 6C | Polytetrafluoroethylene (PTFE) CAS #9002-84-0 | Anti-dripping agent | DuPont |
| | Maleic Anhydride CAS #108-31-6 | Compatibilizer | Sigma Aldrich |

Preparation of Low MW Polyphenylene Ether

The Low Molecular Weight (MW) Polyphenylene Ether (PPE) was produced in a 16 mm Prism twin co rotating extruder by mixing Bluestar PPE (from China National Blue Star, LXR40 PPE), BPA (Acros Organic, CAS #80-05-7) and dicumyl peroxide (AkzoNobel, CAS #80-43-3) at a weight percent of the overall composition of 98.29%, 0.62% and 1.09% respectively. The mixture was extruded at 320° C. in Zone 1, 310° C. in Zone 2 and 300° C. in Zones 3-9, die temperature 300° C., at 250 RPM into pellets. The molecular weight was determined by gel permeation chromatography (GPC) with chloroform as solvent and polystyrene as reference. Based on the GPC UV calculation, the Low MW PPE has an average weight molecular weight of 58,517 g/mol and a number average molecular weight of 10,505 g/mol.

The ingredients in Table 3 of the Comparative Examples A-O and Examples 1-3 were pre-mixed and then fed into the extruder hopper of a Prism TSE 16 mm twin screw extruder and processed according to the conditions shown in Table 4.

TABLE 4

| Extruder Conditions All Comparative Examples and Examples | |
|---|---|
| Extruder Type | Prism TSE 16 mm twin screw extruder |
| Order of Addition | All ingredients mixed together and fed into the extruder hopper. |
| Zone 1 (set) | 305° C. |
| Zone 2 (set) | 300° C. |
| Zone 3 (set) | 300° C. |
| Zone 4 (set) | 295° C. |
| Zone 5 (set) | 295° C. |
| Zone 6 (set) | 295° C. |
| Zone 7 (set) | 295° C. |
| Zone 8 (set) | 295° C. |
| Zone 9 (set) | 295° C. |
| Die | 285° C. |
| RPM | 400 |

The extrudate was pelletized for later molding.

Before molding, the pellets were dried for 16 hours at 80° C. to reduce moisture content.

Using a DeMag molding machine, Table 5 shows the settings used to mold test bars of each Example and Comparative Example having a thickness of about 1.59 mm (1/16 inch) and about 3.18 mm (1/8 inch).

TABLE 5

| Molding Conditions All Comparative Examples and Examples 120T DeMag molding machine | |
|---|---|
| Drying Conditions before Molding: | |
| Temperature (° C.) | 80 |
| Time (hours) | 16 |
| Temperatures: | |
| Nozzle (° F.) | 460 |
| Zone 1 (° F.) | 450 |
| Zone 2 (° F.) | 440 |
| Zone 3 (° F.) | 430 |
| Mold (° F.) | 140 |
| Speeds: | |
| Screw RPM (%) | 100 |
| % Shot - Inj Vel (in/sec) | 0.8 |
| Pressures: | |
| Injection Pressure (psi) | 1800 |
| Hold Pressure (psi) | 80 |
| Back Pressure (psi) | 15 |

TABLE 5-continued

Molding Conditions
All Comparative Examples and Examples
120T DeMag molding machine

| Timers: | |
|---|---|
| Injection Hold (sec) | 7 |
| Cooling Time (sec) | 10 |
| Operation Settings: | |
| Shot Size (mm) | 0.85 |
| Cushion (mm) | 0.11 |

Performance Results

Table 6-A shows the amount of ingredients in weight percent of the compound and the flame performance tested for Comparative Examples A-O. Table 6-B shows the amount of the ingredients in weight percent of the compound and the flame performance tested for Examples 1-3. Any reference to percent (%) in the discussion of the Examples further below represents the weight percent of the compound unless specified otherwise. Acceptable flammability performance was V-0 at 3.18 mm. Each UL 94 rating was verified by two independent tests. The lower (i.e. the worse) flame retardancy performance is reported as the UL rating for Tables 6-A and 6-B. If a sample did not achieve a V-2 rating or better rating it is designated as having "No rating."

TABLE 6-A

| | Examples | | | | | | | |
|---|---|---|---|---|---|---|---|---|
| | A | B | C | D | E | F | G | H |
| Poly(hexano-6-lactam) (Nylon 6) | 54.4 | 48.9 | 53.9 | 58.9 | 53.9 | 58.9 | 53.9 | 58.9 |
| Polyphosphonate homopolymer | 25.0 | 30.0 | 25.0 | 25.0 | 25.0 | 25.0 | 25.0 | 25.0 |
| Polyphenylene ether (PPE) Mn = 30,000 g/mol ~37,000 g/mol | 20.0 | 20.0 | 20.0 | 15.0 | | | | |
| Polyphenylene ether (PPE) Mn = 10,505 g/mol | | | | | 20.0 | 15.0 | | |
| Polyphenylene ether (PPE) Mn = 17,300 g/mol | | | | | | | 20.0 | 15.0 |
| Polytetrafluoroethylene (PTFE) | 0.5 | 0.5 | 0.5 | 0.5 | 0.5 | 0.5 | 0.5 | 0.5 |
| Maleic anhydride | | 0.5 | 0.5 | 0.5 | 0.5 | 0.5 | 0.5 | 0.5 |
| Stabilizer | 0.1 | 0.1 | 0.1 | 0.1 | 0.1 | 0.1 | 0.1 | 0.1 |
| Total | 100 | 100 | 100 | 100 | 100 | 100 | 100 | 100 |
| Ratio of polyphosphonate homopolymer to PPE | 2.5:2 | 3:2 | 2.5:2 | 2.5:1.5 | 2.5:2 | 2.5:1.5 | 2.5:2 | 2.5:1.5 |
| Test Results | | | | | | | | |
| Molded part thickness (mm) | 3.18 | 3.18 | 3.18 | 3.18 | 3.18 | 3.18 | 3.18 | 3.18 |
| Dripped/Ignited cotton | No | No | No | No | No | No | No | No |
| UL 94 rating | No-rating | No-rating | No-rating | No-rating | No-rating | No-rating | No-rating | No-rating |

| | Examples | | | | | | |
|---|---|---|---|---|---|---|---|
| | I | J | K | L | M | N | O |
| Poly(hexano-6-lactam) (Nylon 6) | 99.4 | 49.4 | 59.1 | 49.1 | 49.1 | 39.1 | 49.1 |
| Polyphosphonate homopolymer | | 50.0 | 20.0 | 20.0 | 10.0 | 10.0 | |
| Polyphenylene ether (PPE) Mn = 30,000 g/mol ~37,000 g/mol | | | 20.0 | 30.0 | 40.0 | 50.0 | 50.0 |
| Polyphenylene ether (PPE) Mn = 10,505 g/mol | | | | | | | |
| Polyphenylene ether (PPE) Mn = 17,300 g/mol | | | | | | | |
| Polytetrafluoroethylene (PTFE) | 0.5 | 0.5 | 0.5 | 0.5 | 0.5 | 0.5 | 0.5 |

TABLE 6-A-continued

| | | | | | | | |
|---|---|---|---|---|---|---|---|
| Maleic anhydride | | | 0.3 | 0.3 | 0.3 | 0.3 | 0.3 |
| Stabilizer | 0.1 | 0.1 | 0.1 | 0.1 | 0.1 | 0.1 | 0.1 |
| Total | 100 | 100 | 100 | 100 | 100 | 100 | 100 |
| Ratio of polyphosphonate homopolymer to PPE | N/A | N/A | 1:1 | 2:3 | 1:4 | 1:5 | N/A |
| Test Results | | | | | | | |
| Molded part thickness (mm) | 3.18 | 3.18 | 3.18 | 3.18 | 3.18 | 3.18 | 3.18 |
| Dripped/Ignited cotton | Yes | Yes | No | No | No | No | Yes |
| UL 94 rating | No-rating | V-2 | No-rating | No-rating | No-rating | No-rating | No-rating |

TABLE 6-B

| | Examples | | |
|---|---|---|---|
| | 1 | 2 | 3 |
| Poly(hexano-6-lactam) (Nylon 6) | 44.1 | 39.1 | 34.1 |
| Polyphosphonate homopolymer | 35.0 | 35.0 | 40.0 |
| Polyphenylene ether Mn = 30,000 g/mol to ~37,000 g/mol | 20.0 | 25.0 | 25.0 |
| Polytetrafluoroethylene (PTFE) | 0.5 | 0.5 | 0.5 |
| Maleic anhydride | 0.3 | 0.3 | 0.3 |
| Stabilizer | 0.1 | 0.1 | 0.1 |
| Total | 100 | 100 | 100 |
| Ratio of polyphosphonate homopolymer to PPE | 3.5:2 | 3.5:2.5 | 4:2.5 |
| Test Results | | | |
| Molded part thickness (mm) | 3.18 | 3.18 | 3.18 |
| Dripped/Ignited cotton | No | No | No |
| UL 94 rating | V-0 | V-0 | V-0 |

Comparative Example I demonstrates that 99% nylon 6 is a flammable material, as represented it receiving no UL 94 rating. Comparative Examples J and O demonstrate that, independently, neither a significant amount of polyphosphonate (50%), nor a significant amount of PPE (50%), added to Nylon 6 are able to improve the compound's flame retardancy to achieve a UL 94 rating of V-0 for a thickness of 3.18 mm, although Comparative Example J results in some improvement by reaching a V-2 rating.

Comparative Examples A-H and K-N combine polyphosphonate and PPE in varying amounts; however, each example still achieves no UL 94 rating. So it was unexpected that the combination of 20% PPE and 35% polyphosphonate resulted in a nylon 6 compound achieving a UL-94 V-0 rating for a thickness of 3.18 mm for Example 1. In addition, Examples 2 and 3, which increased one or both of PPE and polyphosphonate also achieved a V-0 rating at a thickness of 3.18 mm. Examples 1-3 reveal the unique synergist relationship of the ratio of PPE and polyphosphonate to provide flame retardancy in nylon 6 compounds. Maleic anhydride is optional as a compatabilizer for the nylon 6 compounds if used as a film to prevent de-lamination. PTFE is also optional as a processing aid.

The invention is not limited to the above embodiments. The claims follow.

What is claimed is:

1. A flame retardant nylon compound consisting of:
 (a) poly(hexano-6-lactam);
 (b) polyphosphonate homopolymer in an amount ranging from about 35 to about 40 weight percent, by weight of the compound;
 (c) polyphenylene ether in an amount ranging from about 20 to about 25 weight percent, by weight of the compound;
 (d) maleic anhydride compatibilizer;
 (e) polytetrafluoroethylene; and
 (f) stabilizer, wherein the stabilizer is a blend of trisarylphosphite and sterically hindered phenolic antioxidant;
 wherein the compound, when injection molded at a thickness of about 3.18 mm, has a UL 94 rating of V-0.

2. The flame retardant nylon compound of claim 1, wherein the polyphosphonate homopolymer has a phosphorus content of greater than about 8 weight percent, a glass transition temperature of at least about 100° C., and a limiting oxygen index of about 50% or higher.

3. A plastic article shaped from the flame retardant nylon compound of claim 1.

4. A flame retardant nylon compound consisting of:
 (a) poly(hexano-6-lactam) in an amount ranging from about 34.1 to about 44.1 weight percent, by weight of the compound;
 (b) polyphosphonate homopolymer in an amount ranging from about 35 to about 40 weight percent, by weight of the compound;
 (c) polyphenylene ether in an amount ranging from about 20 to about 25 weight percent, by weight of the compound;
 (d) maleic anhydride compatibilizer in an amount of about 0.3 weight percent, by weight of the compound;
 (e) polytetrafluoroethylene in an amount of about 0.5 weight percent, by weight of the compound; and
 (f) stabilizer in an amount of about 0.1 weight percent, by weight of the compound, wherein the stabilizer is a blend of trisarylphosphite and sterically hindered phenolic antioxidant;
 wherein the compound, when injection molded at a thickness of about 3.18 mm, has a UL 94 rating of V-0.

5. The flame retardant nylon compound of claim 4, wherein the polyphosphonate homopolymer has a phosphorus content of greater than about 8 weight percent, a glass transition temperature of at least about 100° C., and a limiting oxygen index of about 50% or higher.

6. A plastic article shaped from the flame retardant nylon compound of claim 4.

7. A flame retardant nylon compound consisting of:
(a) poly(hexano-6-lactam);
(b) polyphosphonate homopolymer in an amount ranging from about 35 to about 40 weight percent, by weight of the compound;
(c) polyphenylene ether in an amount ranging from about 20 to about 25 weight percent, by weight of the compound;
(d) maleic anhydride compatibilizer;
(e) polytetrafluoroethylene;
(f) stabilizer, wherein the stabilizer is a blend of trisarylphosphite and sterically hindered phenolic antioxidant; and
(g) optionally pigment, colorant, or dye;
wherein the compound, when injection molded at a thickness of about 3.18 mm, has a UL 94 rating of V-0.

8. The flame retardant nylon compound of claim 7, wherein the polyphosphonate homopolymer has a phosphorus content of greater than about 8 weight percent, a glass transition temperature of at least about 100° C., and a limiting oxygen index of about 50% or higher.

9. A plastic article shaped from the flame retardant nylon compound of claim 7.

* * * * *